United States Patent
Hisada et al.

(10) Patent No.: US 12,537,404 B2
(45) Date of Patent: Jan. 27, 2026

(54) ROTOR

(71) Applicant: KABUSHIKI KAISHA TOSHIBA, Tokyo (JP)

(72) Inventors: Hideki Hisada, Kuwana Mie (JP); Masaru Kano, Yokkaichi Mie (JP); Hidenori Uchida, Mie Mie (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 276 days.

(21) Appl. No.: 18/317,842

(22) Filed: May 15, 2023

(65) Prior Publication Data

US 2023/0283127 A1    Sep. 7, 2023

Related U.S. Application Data (63) Continuation of application No. PCT/JP2022/000102, filed on Jan. 5, 2022.

(51) Int. Cl.
*H02K 1/276* (2022.01)

(52) U.S. Cl.
CPC ....... *H02K 1/2766* (2013.01); *H02K 2213/03* (2013.01)

(58) Field of Classification Search
CPC .................................... H02K 1/2766
USPC .................................... 310/156.53
See application file for complete search history.

(56) References Cited

U.S. PATENT DOCUMENTS

| | | | |
|---|---|---|---|
| 2005/0200223 A1* | 9/2005 | Tajima | H02K 1/2766 310/156.55 |
| 2011/0254474 A1 | 10/2011 | Saito et al. | |
| 2011/0291515 A1* | 12/2011 | Li | H02K 21/16 310/156.53 |
| 2012/0200186 A1* | 8/2012 | Sano | H02K 1/2766 310/156.01 |
| 2012/0248915 A1* | 10/2012 | Kagami | H02K 1/2766 310/156.01 |

(Continued)

FOREIGN PATENT DOCUMENTS

| | | |
|---|---|---|
| CN | 112953054 A | 6/2021 |
| JP | 2003-158838 A | 5/2003 |

(Continued)

OTHER PUBLICATIONS

Japanese Patent Office, Decision to Grant a Patent in JP App. No. 2022-559305, 3 pages, with machine translation, 2 pages (Jun. 11, 2024).

(Continued)

*Primary Examiner* — Terrance L Kenerly
*Assistant Examiner* — Theodore L Perkins
(74) *Attorney, Agent, or Firm* — Finnegan, Henderson, Farabow, Garrett & Dunner, LLP (57) ABSTRACT

According to one embodiment, a rotor includes a rotor iron core, a plurality of first magnet accommodation, a plurality of first permanent magnets, a pair of first inner circumferential side magnetic voids, a pair of first outer circumferential side magnetic voids, a pair of first bridge portions, a pair of second magnet accommodation areas, a plurality of second permanent magnets, a pair of second outer circumferential side magnetic voids, a pair of second inner circumferential side magnetic voids, a third magnetic void, and a pair of second bridge portions.

8 Claims, 4 Drawing Sheets

(56) References Cited

U.S. PATENT DOCUMENTS

| | | | |
|---|---|---|---|
| 2013/0119812 A1 | 5/2013 | Takizawa et al. | |
| 2015/0236555 A1 | 8/2015 | Takeda et al. | |
| 2017/0338707 A1* | 11/2017 | Shono | H02K 1/276 |
| 2019/0199150 A1* | 6/2019 | Cesa | H02K 21/14 |
| 2021/0184520 A1 | 6/2021 | Zhang et al. | |
| 2023/0198324 A1 | 6/2023 | Saito et al. | |

FOREIGN PATENT DOCUMENTS

| | | |
|---|---|---|
| JP | 2004-104962 A | 4/2004 |
| JP | 2011-30427 A | 2/2011 |
| JP | 2011-147289 A | 7/2011 |
| JP | 2012-152082 A | 8/2012 |
| JP | 2012-161226 A | 8/2012 |
| JP | 2012-161243 A | 8/2012 |
| JP | 2013-21761 A | 1/2013 |
| JP | 2013-176292 A | 9/2013 |
| JP | 2014-50208 A | 3/2014 |
| JP | 2014-108025 A | 6/2014 |
| JP | 2016-32424 A | 3/2016 |
| JP | 2018-85819 A | 5/2018 |
| JP | 2019-140843 A | 8/2019 |
| JP | 6848135 B1 | 3/2021 |
| WO | WO 2012/014836 A1 | 2/2012 |
| WO | WO 2021/250921 A1 | 12/2021 |

OTHER PUBLICATIONS

Japan Patent Office, International Search Report/Written Opinion of the International Searching Authority, in International Application No. PCT/JP2022/000102 (Mar. 22, 2022), 7 pages, and machine translation, 2 pages.

European Patent Office, Extended European Search Report in EP App. No. 22902478.1 (Jul. 28, 2025).

* cited by examiner

ROTOR

CROSS-REFERENCE TO RELATED APPLICATIONS

This application is a Continuation Application of PCT Application No. PCT/JP2022/000102, filed Jan. 5, 2022, the entire contents of which are incorporated herein by reference.

FIELD

Embodiments described herein relate generally to a rotor of a rotating electrical machine comprising a permanent magnet.

BACKGROUND

In recent years, permanent magnets with a high magnetic energy product have been developed by the remarkable research and development of permanent magnets. A permanent magnet type of rotating electrical machine using these permanent magnets has been applied as an electric motor or power generator of a train or vehicle. This rotating electrical machine comprises a cylindrical stator, and a columnar rotor rotatably supported inside the stator. The rotor comprises a rotor iron core, and a plurality of permanent magnets buried in the rotor iron core. These permanent magnets form a plurality of magnetic poles in the circumferential direction of the rotor iron core.

In the above permanent magnet type of rotating electrical machine, it is important to sufficiently maintain the strength of the rotor iron core relative to a centrifugal force and electromagnetic attraction.

DETAILED DESCRIPTION

In general, according to one embodiment, a rotor comprises: a rotor iron core; a plurality of first magnet accommodation areas provided at regular intervals in a circumferential direction of the rotor iron core in a state orthogonal to a radial direction of the rotor iron core; a plurality of first permanent magnets accommodated in the respective first magnet accommodation areas and forming a plurality of magnetic poles in the circumferential direction of the rotor iron core; a pair of first inner circumferential side magnetic voids provided in each of the magnetic poles of the rotor iron core, and coming in contact with both end portions of the first magnet accommodation area; a pair of first outer circumferential side magnetic voids provided in each of the magnetic poles of the rotor iron core, close to the first inner circumferential side magnetic voids, and open to outside of the rotor iron core through an outer circumferential surface of the rotor iron core; a pair of first bridge portions provided between the respective first inner circumferential side magnetic voids and the respective first outer circumferential side magnetic voids in each of the magnetic poles of the rotor iron core such that a mutual interval expands from an outer circumferential side of the rotor iron core to an inner circumferential side; a pair of second magnet accommodation areas provided in a state interposing the first magnet accommodation area between them in each of the magnetic poles of the rotor iron core, and comprising an end portion located on the outer circumferential side of the rotor iron core and the other end portion located on the inner circumferential side of the rotor iron core; a plurality of second permanent magnets accommodated in the respective second magnet accommodation areas and forming the magnetic poles together with the first permanent magnets; a pair of second outer circumferential side magnetic voids coming in contact with the end portions of the second magnet accommodation areas, respectively, in each of the magnetic poles of the rotor iron core, and open to the outside of the rotor iron core through the outer circumferential surface of the rotor iron core; a pair of second inner circumferential side magnetic voids coming in contact with the other end portions of the second magnetic accommodation areas, respectively, in each of the magnetic poles of the rotor iron core; a third magnetic void provided between the second inner circumferential side magnetic voids in each of the magnetic poles of the rotor iron core; and a pair of second bridge portions provided between the respective second inner circumferential side magnetic voids and the third magnetic void in each of the magnetic poles of the rotor iron core.

Embodiments of the present invention will be described hereinafter with reference to the accompanying drawings. Structures which are common to the embodiments are denoted by the same reference numbers, overlapping explanations being omitted. Each figure is an exemplary diagram of an embodiment to aid understanding of the embodiment. The shape, dimension, ratio or the like in the drawings may differ from those of the actual device, and may be appropriately changed in light of the following explanation and the known art.

Figure 1:
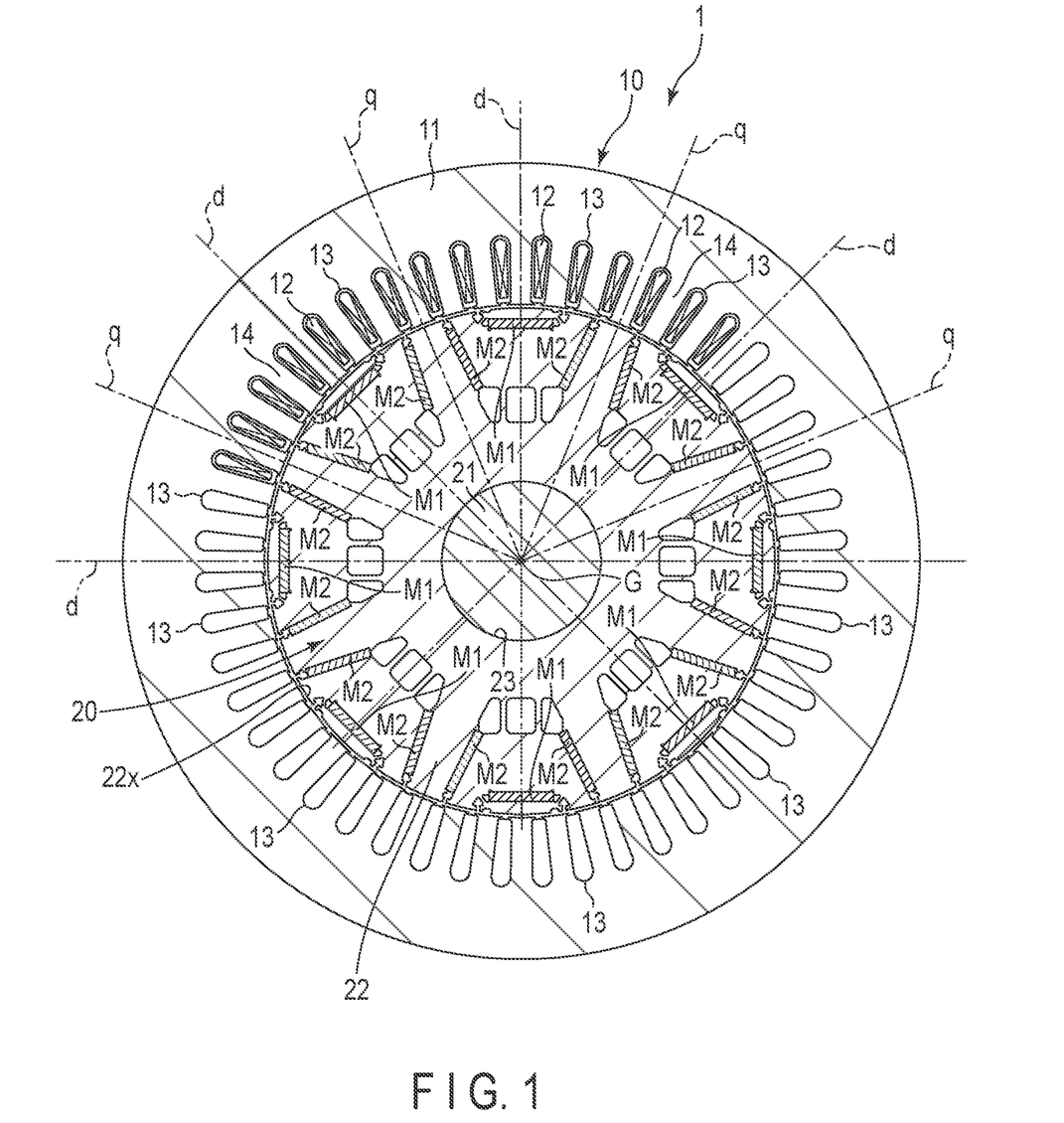
FIG. 1 is a transverse cross-sectional view of a permanent magnet type of rotating electrical machine according to an embodiment.
Figure 2:
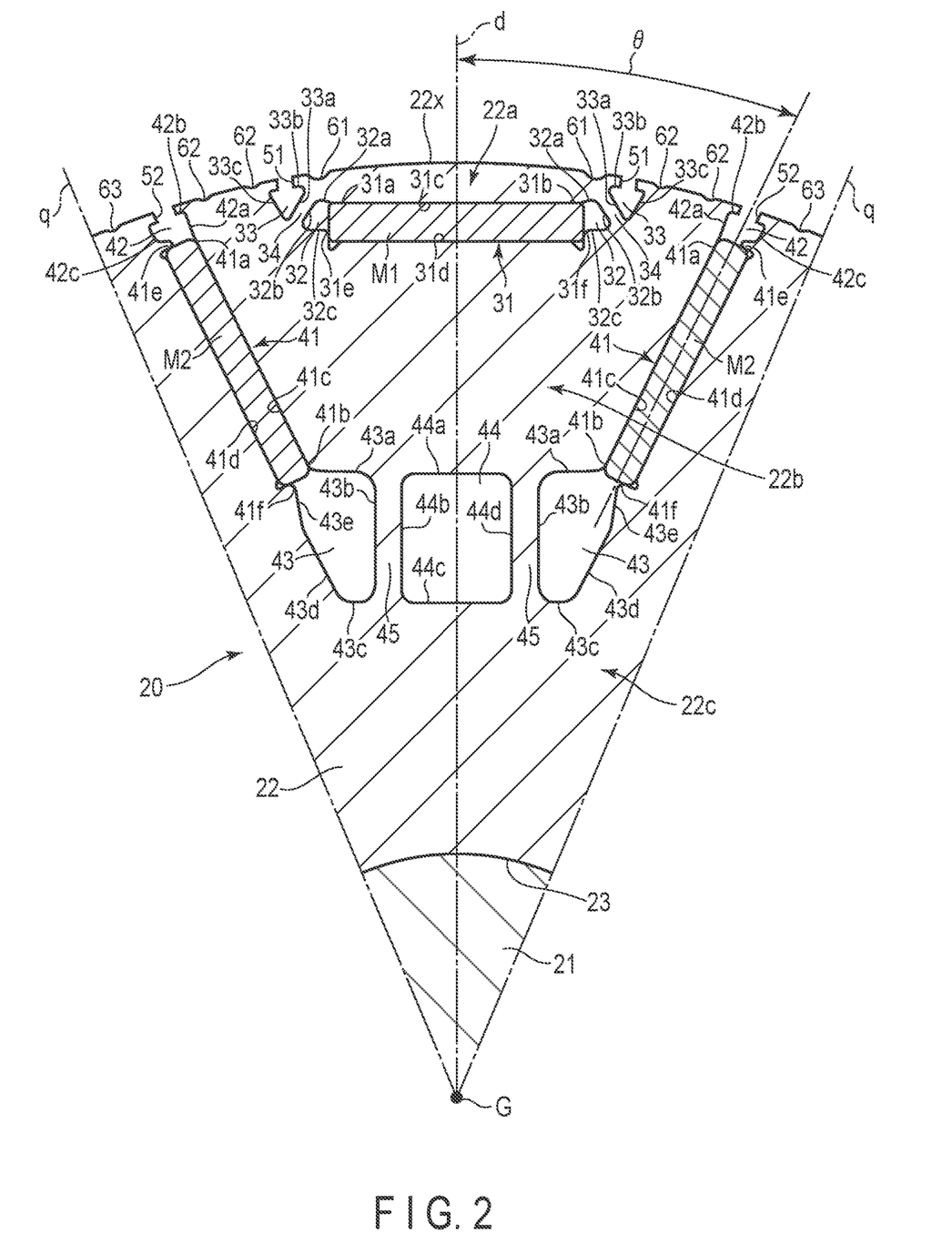
FIG. 2 is a transverse cross-sectional view showing the configuration of a magnetic pole according to the embodiment.

FIG. 1 is a transverse cross-sectional view of a permanent magnet type of rotating electrical machine according to an embodiment. FIG. 2 is a transverse cross-sectional view in which a magnetic pole in a rotor iron core is enlarged.

As shown in FIG. 1, a rotating electrical machine 1 is configured as, for example, an inner rotor type of rotating electrical machine, and includes an annular or cylindrical stator 10 supported in a fixing frame (not shown), and a columnar rotor 20 comprising a central axis (rotation center) G and supported inside the stator 10 rotatably and coaxially with the stator 10. For example, the rotating electrical machine 1 is suitably applied to a drive motor or a power generator in a hybrid electric vehicle (HEV) or an electric vehicle (EV).

The stator 10 comprises a cylindrical stator iron core 11, and an armature winding (coil) 12 wound onto the stator iron core 11. The stator iron core 11 is structured by concentrically stacking a large number of annular electromagnetic steel plates (iron core pieces) formed of a magnetic material, for example, silicon steel. A plurality of slots 13 are formed in the inner circumferential portion of the stator iron core 11.

The slots 13 are arranged at regular intervals in the circumferential direction of the stator iron core 11. The slots 13 are open on the inner circumferential surface of the stator iron core 11 and extend in a radiation direction from the inner circumferential surface. Each slot 13 extends over the entire length of the stator iron core 11 in the axial direction of the stator iron core 11. As these slots 13 are formed, a plurality of (for example, 48) stator teeth 14 facing the rotor 20 are formed in the inner circumferential portion of the stator iron core 11. The armature windings 12 are inserted into the respective slots 13 and are wound onto the respective stator teeth 14. By supplying electricity to the armature windings 12, a predetermined flux linkage is formed in the stator 10 (stator teeth 14).

The rotor 20 comprises a columnar rotation shaft 21 in which both ends are rotatably supported by a bearing (not shown), a cylindrical rotor iron core 22 fixed to substantially the middle portion in the axial direction of the rotation shaft 21, and a plurality of permanent magnets M1 and a plurality of permanent magnets M2 buried in the rotor iron core 22. The rotor 20 is coaxially provided inside the stator 10 such that a tiny gap (air gap) is interposed between the rotor 20 and the inner circumferential surface of the stator 10. The outer circumferential surface of the rotor 20 faces the inner circumferential surface of the stator 10 across an intervening tiny gap. The rotor iron core 22 comprises an inner hole 23 formed coaxially with the central axis G. The rotation shaft 21 is inserted and fitted into the inner hole 23 and extends coaxially with the rotor iron core 22.

The rotor iron core 22 is structured as a stacked layer body prepared by concentrically stacking a large number of annular electromagnetic steel plates (iron core pieces) formed of a magnetic material, for example, silicon steel. The rotor iron core 22 comprises the above central axis G extending in the stacked direction of the iron core pieces, and an outer circumferential surface 22x facing the inner circumferential surface of the stator 10 across an intervening tiny gap (air gap).

The rotor iron core 22 comprises a plurality of magnetic poles, for example, eight magnetic poles. In the rotor iron core 22, a line which passes through the central axis G and the boundary between magnetic poles adjacent in the circumferential direction and extends in the radial direction of the rotor iron core 22 is referred to as a q-axis. Further, an axis which is electrically spaced apart from each q-axis at 90° in the circumferential direction, in other words, a line which extends from the central axis G in the radial direction and passes through the center in the circumferential direction of each magnetic pole, is referred to as a d-axis. A direction in which a flux linkage formed by the stator 10 easily flows is a q-axis. These d-axis and q-axis are alternately provided in the circumferential direction of the rotor iron core 22 with a predetermined phase. The portion of a magnetic pole of the rotor iron core 22 refers to the area between two q-axes adjacent in the circumferential direction (the circumferential angle area of ⅛ of the circumference). The center in the circumferential direction of a magnetic pole is a d-axis.

As shown in FIG. 2, the rotor iron core 22 comprises a plurality of rectangular first magnet accommodation areas 31 provided at regular intervals in the circumferential direction of the rotor iron core 22 in a state orthogonal to the respective d-axes (radial direction) of the rotor iron core 22.

Permanent magnets M1 are accommodated in the respective first magnet accommodation areas 31 and are fixed to the rotor iron core 22 by, for example, an adhesive. Permanent magnets M1 are accommodated in these first magnet accommodation areas 31 one by one and form the eight magnetic poles described above. Each permanent magnet M1 is magnetized in a direction perpendicular to the long sides. For example, the transverse section of each permanent magnet M1 is formed into a rectangular shape like a long and thin plate. Each permanent magnet M1 has a length substantially equal to the axial length of the rotor iron core 22. Each permanent magnet M1 is buried over substantially the entire length of the rotor iron core 22. Each permanent magnet M1 may be configured by combining a plurality of axial (longitudinal) separate magnets. In this case, each permanent magnet M1 is formed such that the total length of the separate magnets is substantially equal to the axial length of the rotor iron core 22.

Each first magnet accommodation area 31 is formed into a rectangular shape corresponding to the cross-sectional shape of each permanent magnet M1 so as to penetrate the rotor iron core 22 in the axial direction. Each first magnet accommodation area 31 comprises an end portion 31a and the other end portion 31b. These end portions 31a and 31b are open in the longitudinal direction. Each first magnet accommodation area 31 further comprises an outer edge (outer circumferential side long side) 31c on a side facing the outer circumferential surface 22x of the rotor iron core 22, and an inner edge (inner circumferential side long side) 31d on a side facing the central axis G. In the rotor iron core 22, magnet retention protrusions 31e and 31f for restricting the motion of each permanent magnet M1 are formed in an area extending from the inner edge 31d to an end portion 31a of the first magnet accommodation area 31 and an area extending from the inner edge 31d to the other end portion 31b, respectively.

In each magnetic pole of the rotor iron core 22, a pair of first inner circumferential side magnetic voids 32 in contact with an end portion 31a and the other end portion 31b of the first magnet accommodation area 31 is provided. The first inner circumferential side magnetic voids 32 are formed so as to penetrate the rotor iron core 22 in the axial direction. Each of the first inner circumferential side magnetic voids 32 is a magnetic void containing a nonmagnetic material such as air, comprises edge 32a continuous with the outer edge 31c of the first magnet accommodation area 31, edge 32b extending at a slant from edge 32a along the first bridge portion 34 described later, and edge 32c extending from edge 32b and connected to the magnet retention protrusion 31e or 31f described above, functions as a flux barrier which prevents a short-circuit of a magnetic flux (magnet magnetic flux) in the end portion of permanent magnet M1 and also contributes to the reduction in the weight of the rotor iron core 22.

In each magnetic pole of the rotor iron core 22, a pair of first outer circumferential side magnetic voids 33 close to the first inner circumferential side magnetic voids 32 and open to the outside of the rotor iron core 22 through the outer circumferential surface 22x of the rotor iron core 22 is provided. The first outer circumferential side magnetic voids 33 are formed so as to penetrate the rotor iron core 22 in the axial direction. Each of the first outer circumferential side magnetic voids 33 is a magnetic void, includes edge 33a facing the first inner circumferential side magnetic void 32, edge 33b bending from edge 33a and partly open to the outer circumference of the rotor iron core 22 through the outer circumferential surface 22x while facing the outer circumferential surface 22x, and edge 33c extending from edge 33b and connected to edge 33a, prevents a short-circuit of a magnet magnetic flux in the rotor iron core 22 as edge 33b is open to the outside of the rotor iron core 22, and also contributes to the reduction in the weight of the rotor iron core 22.

In each magnetic pole of the rotor iron core 22, a pair of first bridge portions 34 in which the interval between them gradually expands from the outer circumferential side of the rotor iron core 22 to the inner circumferential side is provided between the respective first inner circumferential side magnetic voids 32 and the respective first outer circumferential side magnetic voids 33.

The first magnet accommodation area 31, permanent magnet M1, the first inner circumferential side magnetic voids 32, the first outer circumferential side magnetic voids 33 and the first bridge portions 34 form a flux barrier of a first layer. The area on the outer circumferential side relative to this flux barrier of the first layer is a first iron core portion 22a.

In each magnetic pole of the rotor iron core 22, a pair of second magnet accommodation areas 41 in which an end portion 41a is located on the outer circumferential side of the rotor iron core 22 and the other end portion 41b is located on the inner circumferential side of the rotor iron core 22 is provided in a state interposing the first magnet accommodation area 31 between them. The second magnet accommodation areas 41 are arranged in, for example, substantially a V-shape so as to be line-symmetric with respect to the d-axis when they are viewed on a transverse section orthogonal to the central axis G of the rotor iron core 22. The second magnet accommodation areas 41 extend at a slant at angle θ less than 90° with respect to the d-axis. In other words, the second magnet accommodation areas 41 are provided at a slant such that the distance from the d-axis gradually increases from the inner circumferential side of the rotor iron core 22 to the outer circumferential side. Angle θ is not limited to the example shown in the figure and may be freely changed.

Permanent magnets M2 are accommodated in the respective second magnet accommodation areas 41 and are fixed to the rotor iron core 22 by, for example, an adhesive. Permanent magnets M2 form each of the magnetic poles described above together with permanent magnet M1. Each permanent magnet M2 is magnetized in a direction perpendicular to the long sides. For example, the transverse section of each permanent magnet M2 is formed into a rectangular shape like a long and thin plate. Each permanent magnet M2 has a length substantially equal to the axial length of the rotor iron core 22. Each permanent magnet M2 is buried over substantially the entire length of the rotor iron core 22. Each permanent magnet M2 may be configured by combining a plurality of axial (longitudinal) separate magnets. In this case, each permanent magnet M2 is formed such that the total length of the separate magnets is substantially equal to the axial length of the rotor iron core 22.

Each second magnet accommodation area 41 is formed into a rectangular shape corresponding to the cross-sectional shape of each permanent magnet M2 so as to penetrate the rotor iron core 22 in the axial direction. Each second magnet accommodation area 41 comprises an end portion 41a and the other end portion 41b in the longitudinal direction and comprises an edge 41c on a side facing the d-axis and the other edge 41d on a side facing the q-axis. In the rotor iron core 22, magnet retention protrusions 41e and 41f for restricting the motion of each permanent magnet M2 are formed in an area extending from edge 41d to end portion 41a of the second magnet accommodation area 41 and an area extending from edge 41d to end portion 41b, respectively.

In each magnetic pole of the rotor iron core 22, a pair of second outer circumferential side magnetic voids 42 coming in contact with end portions 41a of the second magnet accommodation areas 41 and open to the outside of the rotor iron core 22 through the outer circumferential surface 22x of the rotor iron core 22 is provided. The second outer circumferential side magnetic voids 42 are formed so as to penetrate the rotor iron core 22 in the axial direction. Each of the second outer circumferential side magnetic voids 42 is a magnetic void, includes edge 42a extending from edge 41c of the second magnet accommodation area 41 so as to be flush with edge 41c, edge 42b bending from edge 42a and partly open to the outer circumference of the rotor iron core 22 through the outer circumferential surface 22x while facing the outer circumferential surface 22x, and edge 42c extending from edge 42b and connected to magnet retention protrusion 41e, functions as a flux barrier which prevents a short-circuit of a magnetic flux (magnet magnetic flux) in an end portion of permanent magnet M2, contributes to the reduction in the weight of the rotor iron core 22, and prevents a short-circuit of a magnet magnetic flux in the rotor iron core 22 especially as edge 42b is open to the outer circumference of the rotor iron core 22.

In each magnetic pole of the rotor iron core 22, a pair of second inner circumferential side magnetic voids 43 in contact with the other end portions 41b of the second magnet accommodation areas 41 is provided. The second inner circumferential side magnetic voids 43 are formed so as to penetrate the rotor iron core 22 in the axial direction. Each of the second inner circumferential side magnetic voids 43 is a magnetic void, includes edge 43a extending from a position which is in contact with edge 41c of the second magnet accommodation area 41 to the d-axis, edge 43b extending from edge 43a to the inner hole 23, edge 43c bending from edge 43b to the q-axis side, edge 43d rising from edge 43c toward edge 41d of the second magnet accommodation area 41, and edge 43e extending from edge 43d and connected to the magnet retention protrusion 41f described above, functions as a flux barrier which prevents a short-circuit of a magnetic flux (magnet magnetic flux) in the other end portion of permanent magnet M2, and also contributes to the reduction in the weight of the rotor iron core 22.

In each magnetic pole of the rotor iron core 22, a third magnetic void 44 is provided between the second inner circumferential side magnetic voids 43. The third magnetic void 44 is a magnetic void, has a rectangular cross-sectional shape consisting of four edges 44a to 44d, and is formed over the entire length of the rotor iron core 22 in the axial direction. Of the four edges 44a to 44d forming the third magnetic void 44, edge 44a located on the outer circumferential side faces the first magnet accommodation area 31 in a state orthogonal to the d-axis, and edge 44c located on the inner circumferential side faces the inner hole 23 in a state parallel to edge 44a, and edges 44b and 44d located between these edges 44a and 44c are adjacent to the second bridge portions 45 described later in a state parallel to each other. Edge 44a on the outer circumferential side is located on the same line as a line connecting the outer circumferential side edges 43a of the second inner circumferential side magnetic voids 43 to each other. Edge 44c on the inner circumferential side is located on the same line as a line connecting the inner circumferential side edges 43c of the second inner circumferential side magnetic voids 43 to each other. The second inner circumferential side magnetic voids 43 are the passage of a refrigerant (cooling oil), and also contribute to the reduction in the weight of the rotor iron core 22.

In each magnetic pole of the rotor iron core 22, a pair of second bridge portions 45 is provided between the respective second inner circumferential side magnetic voids 43 and the third magnetic void 44.

The second magnet accommodation areas 41, permanent magnets M2, the second outer circumferential side magnetic voids 42, the second inner circumferential side magnetic voids 43, the third magnetic void 44 and the second bridge portions 45 form a flux barrier of a second layer. The area surrounded by this flux barrier of the second layer and the flux barrier of the first layer described above is a second iron core portion 22*b*. The area on the inner circumferential side relative to the flux barrier of the second layer is a third iron core portion 22*c*.

A pair of first bridge portions 34 in each magnetic pole of the rotor iron core 22 is connection elements which connect the first iron core portion 22*a* to the second iron core portion 22*b*, and is formed into a pillar shape extending at a slant such that the interval between them gradually expands from the inner circumferential side of the rotor iron core 22 to the outer circumferential side. The widths of the first bridge portions 34 are equal to each other, and are set in a required minimum state so as to be as less as possible to reduce the leak of a magnet magnetic flux but so as to sufficiently have strength for the great bending stress applied to the first bridge portions 34. Even if an electromagnetic force in the circumferential direction is applied to the first iron core portion 22*a* of the rotor iron core 22 under a situation where a large torque is generated, the first iron core portion 22*a* can be stably supported from the second iron core portion 22*b* side by the first bridge portions 34.

A pair of second bridge portions 45 in each magnetic pole of the rotor iron core 22 is connection elements which connect the second iron core portion 22*b* to the third iron core portion 22*c*, and is formed into a pillar shape extending substantially parallel to the d-axis. The widths of the second bridge portions 45 are equal to each other, and are set in a required minimum state so as to be as less as possible to reduce the leak of a magnet magnetic flux but so as to be adapted to the centrifugal stress generated in the respective second bridge portions 45. Even if an electromagnetic force in the circumferential direction is applied to the first iron core portion 22*a* and the second iron core portion 22*b* of the rotor iron core 22 under a situation where a large torque is generated, the first iron core portion 22*a* and the second iron core portion 22*b* can be stably supported from the third iron core portion 22*c* side by the second bridges 45.

Figure 3:
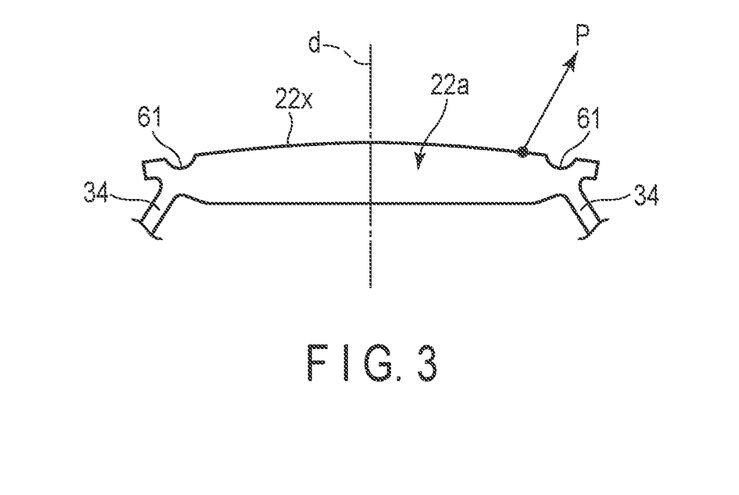
FIG. 3 is a diagram showing an example of the force applied to a rotor iron core in FIG. 2.

In particular, as the first bridge portions 34 incline such that the interval between them gradually expands from the inner circumferential side of the rotor iron core 22 to the outer circumferential side, the bending stress applied to the first bridge portions 34 can be reduced. In other words, as shown in FIG. 3, even if force P in the arrow direction such as a centrifugal force or electromagnetic attraction is applied to the outer circumferential surface 22*x* of the rotor torque 22 in a state where the rotor iron core 22 generates toque clockwise in the figure, the bending stress applied to the base portions of the first bridge portions 34 can be reduced, thereby minimizing the deformation of the first bridge portions 34 and the deformation of the outer circumferential part of the rotor iron core 22 in connection with the deformation of the first bridge portions 34.

Figure 4:
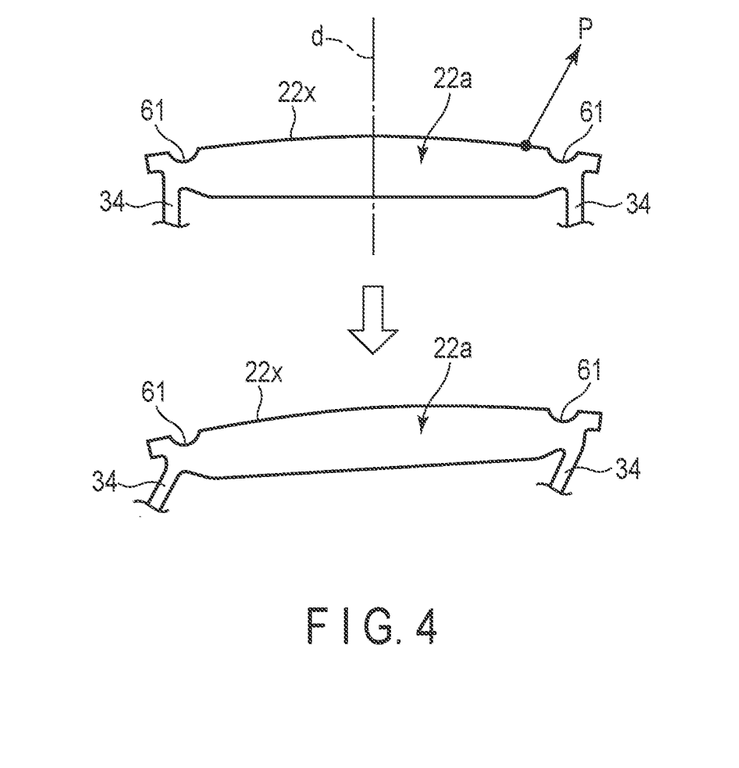
FIG. 4 is a diagram showing an example in which bridge portions deform as a reference of the embodiment.

If, as shown in FIG. 4, the first bridge portions 34 are configured to extend parallel to each other, when force P similar to the above is applied to the outer circumferential surface 22*x* of the rotor torque 22, a great bending stress may be applied to the base portions of the first bridge portions 34, thereby deforming the first bridge portions 34 so as to collapse. This problem does not occur in the present embodiment.

Figure 5:
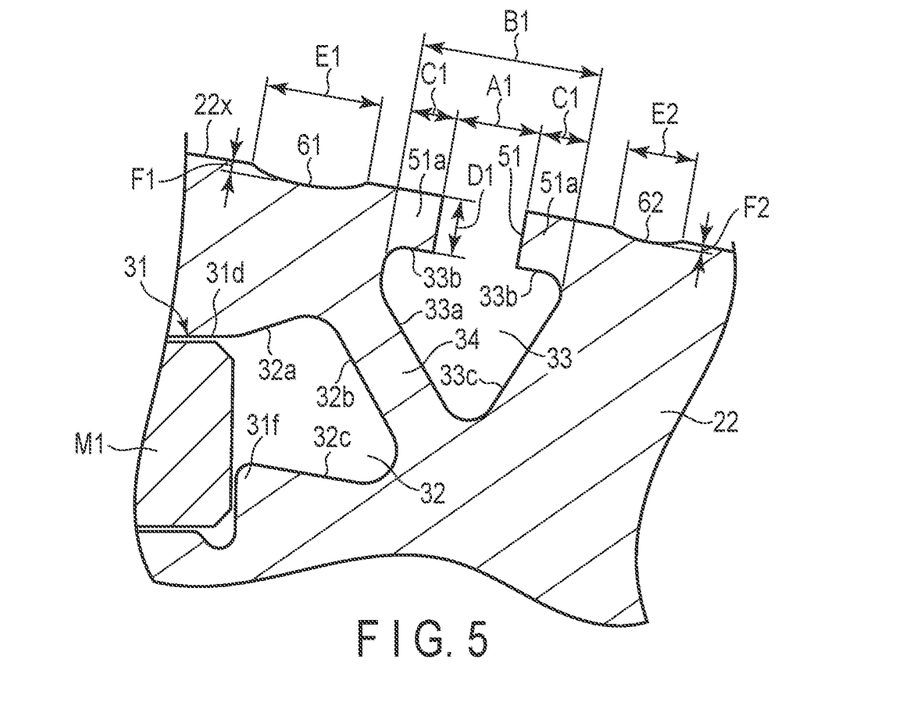
FIG. 5 is a transverse cross-sectional view in which a relevant part of FIG. 2 is enlarged.

In each magnetic pole of the rotor iron core 22, as shown in closeup in FIG. 5, a pair of first cut holes 51 is provided such that the outer circumferential surface 22*x* communicates with the first outer circumferential side magnetic voids 33 and such that these first outer circumferential side magnetic voids 33 open into the outside of the outer circumferential surface 22*x*. In each magnetic pole of the rotor iron core 22, as shown in closeup in FIG. 6, a pair of second cut holes 52 is provided such that the outer circumferential surface 22*x* communicates with the second outer circumferential side magnetic voids 42 and such that these second outer circumferential side magnetic voids 42 open into the outside of the outer circumferential surface 22*x*. The first cut holes 51 and the second cut holes 52 extend over the rotor iron core 22 in the axial direction.

Figure 6:
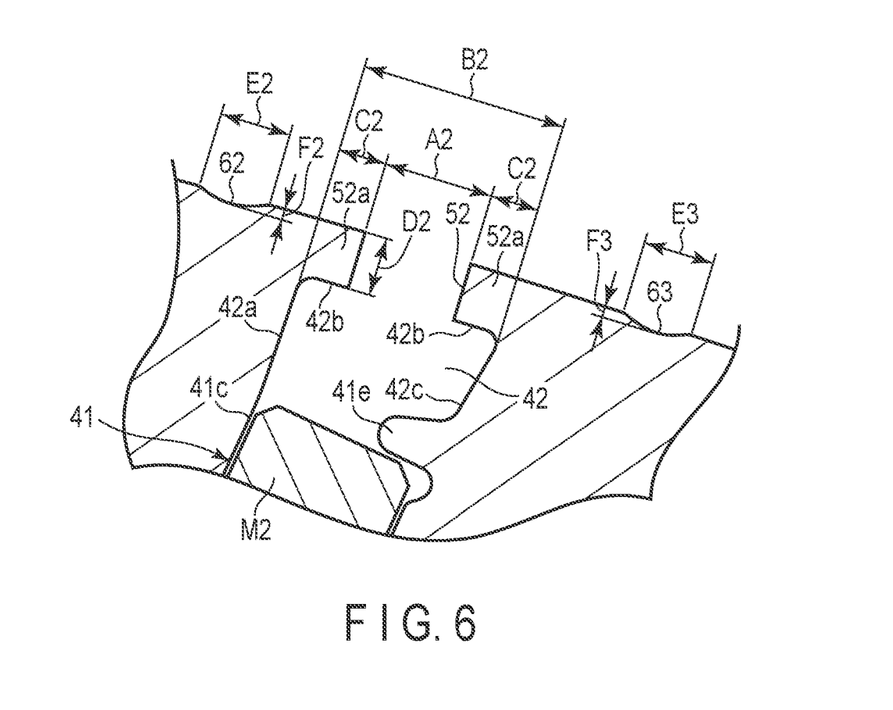
FIG. 6 is a transverse cross-sectional view in which another relevant part of FIG. 2 is enlarged.

On the outer circumferential surface 22*x* of the rotor iron core 22, at least two curved first trench portions (recess portions or face cut portions) 61 are provided between the first outer circumferential side magnetic voids 33 for each magnetic pole. On the outer circumferential surface 22*x* of the rotor iron core 22, at least two curved second trench portions (recess portions or face cut portions) 62 are provided between the first outer circumferential side magnetic voids 33 and the second outer circumferential side magnetic voids 42 for each magnetic pole.

On the outer circumferential surface 22*x* of the rotor iron core 22, curved third trench portions (recess portions or face cut portions) 63 are provided between the second outer circumferential side magnetic voids 42 and the q-axes for each magnetic pole. These trench portions 61 to 63 extend over the rotor iron core 22 in the axial direction.

In a manner similar to that of the present embodiment, in a structure in which the flux barrier of the first layer is open to the outside of the rotor iron core 22 through the first cut holes 51, and further, the flux barrier of the second layer is open to the outside of the rotor iron core 22 through the second cut holes 52, as the magnetic resistance of the outer circumferential portion of the rotor iron core 22 is steeply changed, noise, oscillation, torque pulsation and the like easily occur.

In consideration of this matter, in the present embodiment, on the outer circumferential surface 22*x* of the rotor iron core 22, the first trench portions 61 are provided between the first cut holes 51 in each magnetic pole, and the second trench portions 62 are provided between the first cut holes 51 and the second cut holes 52 in each magnetic pole, and the third trench portions 63 are provided between the second cut holes 52 and the q-axes in each magnetic pole. Since at least the first trench portions 61 and the second trench portions 62 are provided, the change of the magnetic resistance of the outer circumferential portion of the rotor iron core 22 can be suppressed to the extent of a practical level.

Further, width E1 of the first trench portions 61 in the circumferential direction and depth F1 of the first trench portions 61 in the radial direction are greater than width E2 of the second trench portions 62 in the circumferential direction and depth F2 of the second trench portions 62 in the radial direction. By this structure, the distribution of flux linkage in the rotor iron core 22 and the stator 10 is made more appropriate. In this way, noise, oscillation and torque pulsation can be more effectively reduced.

In addition, width A1 of each first cut hole 51 in the circumferential direction is less than width B1 of each first outer circumferential side magnetic void 33 in the circumferential direction. The portion in which each first cut hole 51 is narrower than each first outer circumferential side magnetic void 33 in the circumferential direction is chip portion 51a. Width A2 of each second cut hole 52 in the circumferential direction is less than width B2 of each second outer circumferential side magnetic void 42 in the circumferential direction. The portion in which each second cut hole 52 is narrower than each second outer circumferential side magnetic void 42 in the circumferential direction is chip portion 52a.

To more smoothly change the magnetic resistance of the outer circumferential portion of the rotor iron core 22, the provision of chip portions 51a and 52a is important in addition to the provision of the first trench portions 61 and the second trench portions 62.

In particular, the ratio (=D1/C1) between depth D1 of each first cut hole 51 in the radial direction and width C1 [=(B1−A1)/2] of chip portion 51a in the circumferential direction is set in the range of 0.7 to 1.1. The ratio (=D2/C2) between depth D2 of each second cut hole 52 in the radial direction and width C2 [=(B2−A2)/2] of chip portion 52a in the circumferential direction is set in the range of 0.7 to 1.1. These ranges are desirable to more smoothly change the magnetic resistance of the outer circumferential portion of the rotor iron core 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, dimension, shape or the like of the rotor is not limited to the embodiments described above, and may be changed in various ways depending on the design.

What is claimed is:

1. A rotor comprising:
   a rotor iron core;
   a plurality of first magnet accommodation areas provided at regular intervals in a circumferential direction of the rotor iron core in a state orthogonal to a radial direction of the rotor iron core;
   a plurality of first permanent magnets accommodated in the respective first magnet accommodation areas and forming a plurality of magnetic poles in the circumferential direction of the rotor iron core;
   a pair of first inner circumferential side magnetic voids provided in each of the magnetic poles of the rotor iron core, and coming in contact with both end portions of the first magnet accommodation area;
   a pair of first outer circumferential side magnetic voids provided in each of the magnetic poles of the rotor iron core, close to the first inner circumferential side magnetic voids, and open to outside of the rotor iron core through an outer circumferential surface of the rotor iron core;
   a pair of first bridge portions provided between the respective first inner circumferential side magnetic voids and the respective first outer circumferential side magnetic voids in each of the magnetic poles of the rotor iron core such that a mutual interval expands from an outer circumferential side of the rotor iron core to an inner circumferential side;
   a pair of second magnet accommodation areas provided in a state interposing the first magnet accommodation area between them in each of the magnetic poles of the rotor iron core, and comprising an end portion located on the outer circumferential side of the rotor iron core and the other end portion located on the inner circumferential side of the rotor iron core;
   a plurality of second permanent magnets accommodated in the respective second magnet accommodation areas and forming the magnetic poles together with the first permanent magnets;
   a pair of second outer circumferential side magnetic voids coming in contact with the end portions of the second magnet accommodation areas, respectively, in each of the magnetic poles of the rotor iron core, and open to the outside of the rotor iron core through the outer circumferential surface of the rotor iron core;
   a pair of second inner circumferential side magnetic voids coming in contact with the other end portions of the second magnetic accommodation areas, respectively, in each of the magnetic poles of the rotor iron core;
   a third magnetic void provided between the second inner circumferential side magnetic voids in each of the magnetic poles of the rotor iron core;
   a pair of second bridge portions provided between the respective second inner circumferential side magnetic voids and the third magnetic void in each of the magnetic poles of the rotor iron core;
   at least two first trench portions provided between the first outer circumferential side magnetic voids for each of the magnetic poles on the outer circumferential surface of the rotor iron core; and
   at least two second trench portions provided between the respective first outer circumferential side magnetic voids and the respective second outer circumferential side magnetic voids for each of the magnetic poles on the outer circumferential surface of the rotor iron core.

2. The rotor of claim 1, wherein
   width E1 of each of the first trench portions in the circumferential direction and depth F1 of each of the first trench portions in the radial direction are greater than width E2 of each of the second trench portions in the circumferential direction and depth F2 of each of the second trench portions in the radial direction.

3. The rotor of claim 2, wherein
   each of the first outer circumferential side magnetic voids includes a first edge facing the first inner circumferential side magnetic void, a second edge bending from the first edge and partly open to an outer circumference of the rotor iron core through the outer circumferential surface while facing the outer circumferential surface, and a third edge extending from the second edge and connected to the first edge.

4. The rotor of claim 1, wherein
   each of the first outer circumferential side magnetic voids includes a first edge facing the first inner circumferential side magnetic void, a second edge bending from the first edge and partly open to an outer circumference of the rotor iron core through the outer circumferential surface while facing the outer circumferential surface, and a third edge extending from the second edge and connected to the first edge.

5. A rotor comprising:

a rotor iron core;

a plurality of first magnet accommodation areas provided at regular intervals in a circumferential direction of the rotor iron core in a state orthogonal to a radial direction of the rotor iron core;

a plurality of first permanent magnets accommodated in the respective first magnet accommodation areas and forming a plurality of magnetic poles in the circumferential direction of the rotor iron core;

a pair of first inner circumferential side magnetic voids provided in each of the magnetic poles of the rotor iron core, and coming in contact with both end portions of the first magnet accommodation area;

a pair of first outer circumferential side magnetic voids provided in each of the magnetic poles of the rotor iron core, close to the first inner circumferential side magnetic voids, and open to outside of the rotor iron core through an outer circumferential surface of the rotor iron core;

a pair of first bridge portions provided between the respective first inner circumferential side magnetic voids and the respective first outer circumferential side magnetic voids in each of the magnetic poles of the rotor iron core such that a mutual interval expands from an outer circumferential side of the rotor iron core to an inner circumferential side;

a pair of second magnet accommodation areas provided in a state interposing the first magnet accommodation area between them in each of the magnetic poles of the rotor iron core, and comprising an end portion located on the outer circumferential side of the rotor iron core and the other end portion located on the inner circumferential side of the rotor iron core;

a plurality of second permanent magnets accommodated in the respective second magnet accommodation areas and forming the magnetic poles together with the first permanent magnets;

a pair of second outer circumferential side magnetic voids coming in contact with the end portions of the second magnet accommodation areas, respectively, in each of the magnetic poles of the rotor iron core, and open to the outside of the rotor iron core through the outer circumferential surface of the rotor iron core;

a pair of second inner circumferential side magnetic voids coming in contact with the other end portions of the second magnetic accommodation areas, respectively, in each of the magnetic poles of the rotor iron core;

a third magnetic void provided between the second inner circumferential side magnetic voids in each of the magnetic poles of the rotor iron core;

a pair of second bridge portions provided between the respective second inner circumferential side magnetic voids and the third magnetic void in each of the magnetic poles of the rotor iron core;

a plurality of first cut holes communicating with the respective first outer circumferential side magnetic voids, open on the outer circumferential surface of the rotor iron core, and causing the respective first outer circumferential side magnetic voids to be open to the outside of the rotor iron core; and a plurality of second cut holes communicating with the respective second outer circumferential side magnetic voids, open on the outer circumferential surface of the rotor iron core, and causing the respective second outer circumferential side magnetic voids to be open to the outside of the rotor iron core, wherein width A1 of each of the first cut holes in the circumferential direction is less than width B1 of each of the first outer circumferential side magnetic voids in the circumferential direction, and width A2 of each of the second cut holes in the circumferential direction is less than width B2 of each of the second outer circumferential side magnetic voids in the circumferential direction.

6. The rotor of claim 5, wherein a ratio (=D1/C1) between depth D1 of each of the first cut holes in the radial direction and width C1 [=(B1−A1)/2] of a portion (chip portion) in which each of the first cut holes is narrower than the first outer circumferential side magnetic void in the circumferential direction in the circumferential direction is 0.7 to 1.1, and a ratio (=D2/C2) between depth D2 of each of the second cut holes in the radial direction and width C2 [=(B2−A2)/2] of a portion (chip portion) in which each of the second cut holes is narrower than the second outer circumferential side magnetic void in the circumferential direction in the circumferential direction is 0.7 to 1.1.

7. The rotor of claim 6, wherein each of the first outer circumferential side magnetic voids includes a first edge facing the first inner circumferential side magnetic void, a second edge bending from the first edge and partly open to an outer circumference of the rotor iron core through the outer circumferential surface while facing the outer circumferential surface, and a third edge extending from the second edge and connected to the first edge.

8. The rotor of claim 5, wherein each of the first outer circumferential side magnetic voids includes a first edge facing the first inner circumferential side magnetic void, a second edge bending from the first edge and partly open to an outer circumference of the rotor iron core through the outer circumferential surface while facing the outer circumferential surface, and a third edge extending from the second edge and connected to the first edge.

* * * * *